(12) United States Patent  
Huang

(10) Patent No.: US 11,968,077 B2  
(45) Date of Patent: Apr. 23, 2024

(54) LINK FAULT MONITORING METHOD AND APPARATUS

(71) Applicant: HUAWEI TECHNOLOGIES CO., LTD., Shenzhen (CN)

(72) Inventor: Yujie Huang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 304 days.

(21) Appl. No.: 17/488,753

(22) Filed: Sep. 29, 2021

(65) Prior Publication Data

US 2022/0021573 A1 Jan. 20, 2022

Related U.S. Application Data

(63) Continuation of application No. PCT/CN2020/081381, filed on Mar. 26, 2020.

(30) Foreign Application Priority Data

Apr. 4, 2019 (CN) .......................... 201910270652.X

(51) Int. Cl.
*H04J 3/14* (2006.01)
*H04L 41/0631* (2022.01)
*H04L 43/0811* (2022.01)
*H04L 43/16* (2022.01)

(52) U.S. Cl.
CPC ........ *H04L 41/065* (2013.01); *H04L 43/0811* (2013.01); *H04L 43/16* (2013.01)

(58) Field of Classification Search
CPC ... H04L 43/16; H04L 41/065; H04L 43/0811; H04L 41/06

See application file for complete search history.

(56) References Cited

U.S. PATENT DOCUMENTS

| 6,804,712 | B1 | | 10/2004 | Kracht | |
|---|---|---|---|---|---|
| 10,461,910 | B1 | * | 10/2019 | Nammi | ................. H04L 5/0053 |
| 2013/0290791 | A1 | | 10/2013 | Basile et al. | |
| 2018/0191426 | A1 | * | 7/2018 | Mirra | ................ H04W 28/0958 |
| 2019/0245810 | A1 | * | 8/2019 | Gulbay | ................. H04L 49/602 |
| 2020/0077457 | A1 | * | 3/2020 | Sevindik | ............. H04W 72/542 |
| 2020/0154345 | A1 | * | 5/2020 | Berggren | .............. H04W 48/02 |

(Continued)

FOREIGN PATENT DOCUMENTS

| CN | 102546965 A | 7/2012 |
|---|---|---|
| CN | 102075978 B | 7/2014 |
| CN | 104202196 A | 12/2014 |

(Continued)

*Primary Examiner* — Brian D Nguyen
(74) *Attorney, Agent, or Firm* — Rimon PC

(57) ABSTRACT

Embodiments of this application provide a link fault monitoring method and related apparatus, and the method includes: A network monitoring device obtains a poor-quality parameter of a target link segment, where the poor-quality parameter is a proportion of the quantity of abnormal terminal devices in the target terminal devices that transmit data by the target link segment; and the network monitoring device determines, based on the poor-quality parameter, whether the target link segment is a faulty link segment. The embodiments of this application provide a technical solution that facilitates monitoring a potential faulty link segment in a network link.

20 Claims, 5 Drawing Sheets

(56) References Cited

U.S. PATENT DOCUMENTS

| | | | | |
|---|---|---|---|---|
| 2020/0244563 A1* | 7/2020 | Coupal | ............ | H04L 25/03878 |
| 2021/0243713 A1* | 8/2021 | Ellenbeck | ........... | H04W 56/002 |

FOREIGN PATENT DOCUMENTS

| | | | |
|---|---|---|---|
| CN | 106874135 | A | 6/2017 |
| CN | 107171817 | A | 9/2017 |
| CN | 108322345 | A | 7/2018 |
| CN | 108809679 | A | 11/2018 |
| CN | 108833202 | A | 11/2018 |
| CN | 109428763 | A | 3/2019 |
| EP | 3461088 | A1 | 3/2019 |
| WO | 2013163429 | A1 | 10/2013 |

* cited by examiner

LINK FAULT MONITORING METHOD AND APPARATUS

CROSS-REFERENCE TO RELATED APPLICATIONS

This application is a continuation of International Application No. PCT/CN2020/081381, filed on Mar. 26, 2020, which claims priority to Chinese Patent Application No. 201910270652.X, filed on Apr. 4, 2019. The disclosures of the aforementioned applications are hereby incorporated by reference in their entireties.

TECHNICAL FIELD

This application relates to the field of network management technologies, and in particular, to a link fault monitoring method and an apparatus.

BACKGROUND

With the development of network technologies, videos, voice, SMS messages, and the like become basic services provided by an operator, and these basic services are usually implemented based on an end-to-end (E2E) network. In an E2E network, data may be transmitted between a terminal device and a content server using a network link. A network link usually includes a plurality of node devices, such as an optical line terminal (OLT), a local area network switch (LAN switch, LSW), a broadband remote access server (BRAS), a core router (CR), and the like. For example, the content server sends data to the terminal device. The data sent by the content server is sequentially transmitted by the node devices in the network link, and arrives at the terminal device as the destination. In addition, the E2E network may further include a terminal monitoring device and a network monitoring device. The terminal monitoring device may obtain a key quality indicator (KQI) of the terminal device, to monitor the terminal device. The network monitoring device may obtain a key performance indicator (KPI) of a link segment between the node devices in the network link, to monitor the network link.

However, for a network operator, how to monitor a possible faulty link segment in each network link in the E2E network needs to be further studied.

SUMMARY

Embodiments of this application disclose a link fault monitoring method and related apparatus, to monitor a potential faulty link segment in a network link.

According to a first aspect, an embodiment of this application provides a link fault monitoring method, including: A network monitoring device obtains a poor-quality parameter of a target link segment, where the poor-quality parameter is a proportion of a quantity of abnormal terminal devices in the target terminal devices that transmit data using the target link segment; and the network monitoring device determines, based on the poor-quality parameter, whether the target link segment is a faulty link segment.

In a network system, data between a terminal device and a content server is sequentially transmitted by using link segments in a network link. When the target link segment is faulty, the proportion of the quantity of abnormal terminal devices in the target terminal devices that transmit data using the target link segment increases. Therefore, the proportion of the quantity of abnormal terminal devices in the target terminal devices can reflect a fault status of the target link segment to some extent. This embodiment of this application provides a new parameter for measuring whether a link segment is faulty: the poor-quality parameter. To be specific, whether the target link segment is a faulty link segment may be determined based on the poor-quality parameter and based on the proportion of the quantity of abnormal terminal devices in the target terminal devices that transmit data using the target link segment.

In a possible implementation, that the network device determines, based on the poor-quality parameter, whether the target link segment is a faulty link segment includes: If the poor-quality parameter is greater than a preset first threshold and at least one network performance indicator of the target link segment meets a preset first determining condition, the network monitoring device determines that the target link segment is a faulty link segment. The first determining condition includes that in the at least one network performance indicator, a first network performance indicator is greater than a second threshold corresponding to the first network performance indicator, and/or a second network performance indicator is less than a third threshold corresponding to the second network performance indicator.

By using the foregoing method, the poor-quality parameter is combined with the network performance indicator, so that the accuracy of the detection result is improved, the quantity of false faulty link segments is reduced, and subsequent network maintenance overheads are further reduced.

In a possible implementation, the network monitoring device may first determine an abnormal terminal device among the at least one target terminal device, and then obtain the poor-quality parameter of the target link segment. The abnormal terminal device is a target terminal device of which at least one user quality indicator meets a preset second determining condition. The second determining condition includes that in the at least one user quality indicator, a first user quality indicator is greater than a fourth threshold corresponding to the first user quality indicator, and/or a second user quality indicator is less than a fifth threshold corresponding to the second user quality indicator.

In a possible implementation, that a network monitoring device obtains a poor-quality parameter of a target link segment includes: The network monitoring device determines a quantity of the at least one target terminal device based on network topology information; and the network monitoring device obtains, based on the quantity of the at least one target terminal device and the quantity of abnormal terminal devices in the at least one target terminal device, the poor-quality parameter corresponding to the target link segment.

In a possible implementation, that the network monitoring device determines an abnormal terminal device in the at least one target terminal device includes: The network monitoring device receives first quality information respectively corresponding to each of the at least one target terminal device, where the first quality information of any target terminal device includes at least one user quality indicator of the target terminal device; and the network monitoring device determines the abnormal terminal device in the at least one target terminal device based on the first quality information.

In the network system, a plurality of terminal monitoring devices usually send the first quality information to the network monitoring device. Each terminal monitoring device is configured to monitor a different terminal device. By using the foregoing method, the network monitoring device determines the abnormal terminal device among the at least one target terminal device based on the determining conditions of the abnormal terminal device. This facilitates unified management by a network operator. Specifically, if the network operator needs to adjust the monitoring strength, only the thresholds corresponding to the network performance indicators in the network monitoring device need to be modified, and the terminal monitoring devices do not need to be modified one by one.

In a possible implementation, that the network monitoring device determines an abnormal terminal device in the at least one target terminal device includes: The network monitoring device receives second quality information sent by a terminal monitoring device, where the second quality information includes identification information of an abnormal terminal device detected by the terminal monitoring device through monitoring; and the network monitoring device determines the abnormal terminal device in the at least one target terminal device based on the second quality information.

By using the foregoing method, the terminal monitoring device obtains a user quality indicator of a terminal device, and determines, with reference to the determining conditions of an abnormal terminal device, whether terminal devices monitored by the terminal monitoring device are abnormal terminal devices. When the network monitoring device detects a target link segment, only abnormal terminal devices among the at least one target terminal device in the target link segment need to be determined, and abnormal user quality indicators do not need to be determined. This helps reduce operation load of the network monitoring device, and improve stability and universality of the network monitoring device.

In a possible implementation, the network monitoring device may first obtain, based on the network topology information and identification information of a to-be-detected terminal device, at least one to-be-detected link used to transmit data for the to-be-detected terminal device, and then obtain the poor-quality parameter of the target link segment. The target link segment is a link segment in the at least one to-be-detected link.

In a possible implementation, if the network monitoring device determines, based on the poor-quality parameter, that the target link segment is a faulty link segment, the network monitoring device may further determine whether the target link segment is a suspected root cause link segment in which an exception has occurred in the to-be-detected terminal device.

According to a second aspect, an embodiment of this application provides an apparatus, where the apparatus includes an obtaining unit and a determining unit. The obtaining unit is configured to obtain a poor-quality parameter of a target link segment, where the poor-quality parameter is the proportion of a quantity of abnormal terminal devices in the at least one target terminal device that transmits data using the target link segment; and the determining unit is configured to determine, based on the poor-quality parameter, whether the target link segment is a faulty link segment.

In a possible implementation, when determining, based on the poor-quality parameter, whether the target link segment is a faulty link segment, the determining unit is configured to: if the poor-quality parameter is greater than a preset first threshold and at least one network performance indicator of the target link segment meets a preset first determining condition, determine that the target link segment is a faulty link segment. The first determining condition includes that in the at least one network performance indicator, a first network performance indicator is greater than a second threshold corresponding to the first network performance indicator, and/or a second network performance indicator is less than a third threshold corresponding to the second network performance indicator.

In a possible implementation, before obtaining the poor-quality parameter of the target link segment, the obtaining unit is further configured to determine an abnormal terminal device in the at least one target terminal device, where the abnormal terminal device is a target terminal device of which at least one user quality indicator meets a preset second determining condition. The second determining condition includes that in the at least one user quality indicator, a first user quality indicator is greater than a fourth threshold corresponding to the first user quality indicator, and/or a second user quality indicator is less than a fifth threshold corresponding to the second user quality indicator.

In a possible implementation, when obtaining the poor-quality parameter of the target link segment, the obtaining unit is configured to: determine a quantity of the at least one target terminal device based on network topology information; and obtain, based on the quantity of the at least one target terminal device and the quantity of abnormal terminal devices in the at least one target terminal device, the poor-quality parameter corresponding to the target link segment.

In a possible implementation, when determining the abnormal terminal device in the at least one target terminal device, the obtaining unit is configured to: receive first quality information respectively corresponding to the at least one target terminal device, where the first quality information of any target terminal device includes at least one user quality indicator of the target terminal device; and determine the abnormal terminal device in the at least one target terminal device based on the first quality information.

In a possible implementation, when determining the abnormal terminal device in the at least one target terminal device, the obtaining unit is configured to: receive second quality information sent by a terminal monitoring device, where the second quality information includes identification information of an abnormal terminal device detected by the terminal monitoring device through monitoring; and determine the abnormal terminal device in the at least one target terminal device based on the second quality information.

In a possible implementation, before obtaining the poor-quality parameter of the target link segment, the obtaining unit is further configured to obtain, based on the network topology information and identification information of a to-be-detected terminal device, at least one to-be-detected link used to transmit data for the to-be-detected terminal device. The target link segment is a link segment in the at least one to-be-detected link.

In a possible implementation, the determining unit is further configured to: if it is determined, based on the poor-quality parameter, that the target link segment is a faulty link segment, determine that the target link segment is a suspected root cause link segment in which an exception occurs in the to-be-detected terminal device.

According to a third aspect, an embodiment of this application further provides a computer readable storage medium. The computer readable storage medium stores instructions, and when the instructions are run on a computer, the computer is enabled to perform the method according to the first aspect.

According to a fourth aspect, an embodiment of this application further provides a computer program product including instructions. When the instructions are run on a computer, the computer is enabled to perform the method according to the first aspect.

These aspects or other aspects of this application are described in more details in the descriptions of the following embodiments.

BRIEF DESCRIPTION OF DRAWINGS

The following briefly describes the accompanying drawings used in embodiments of the present invention.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that in the descriptions of the embodiments of this application, "at least one" refers to one or more, and "a plurality of" refers to two or more. In view of this, "a plurality of" may also be understood as "at least two" in the embodiments of the present invention. The term "and/or" describes an association relationship of associated objects and represents that three relationships may exist. For example, A and/or B may represent the following three cases: Only A exists, both A and B exist, and only B exists. In addition, the character "/", unless otherwise specified, generally indicates an "or" relationship between the associated objects. In addition, it should be understood that, in the description of this application, terms such as "first" and "second" are used only for purposes of distinguishing descriptions, and cannot be understood as indicating or implying relative importance, or as indicating or implying a sequence.

The following clearly describes the technical solutions in the embodiments of this application with reference to the accompanying drawings in the embodiments of this application.

Figure 1:
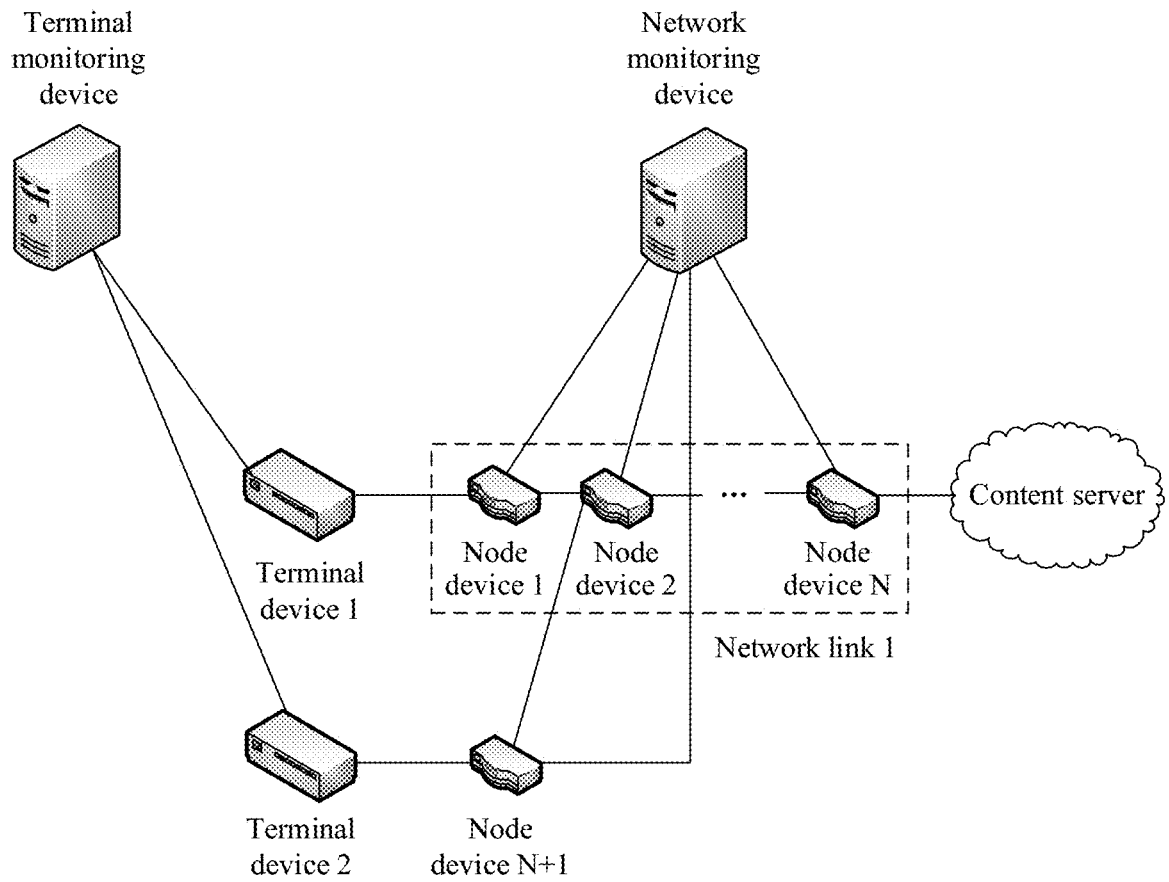
FIG. 1 is a schematic architectural diagram of a possible network system to which an embodiment of this application is applicable.

FIG. 1 is a schematic architectural diagram of a possible network system to which an embodiment of this application is applicable. The network system shown in FIG. 1 includes a plurality of terminal devices (terminal device 1 and terminal device 2) and a plurality of node devices (node device 1, node device 2, . . . , node device N+1), a content server, a terminal monitoring device, and a network monitoring device, where N is greater than or equal to 1. It should be understood that FIG. 1 is merely a schematic architectural diagram of the network system. Quantities of devices such as the terminal device, the terminal monitoring device, and the node device in the network system are not limited in this embodiment of this application. In addition to the devices shown in FIG. 1, the network system used in this embodiment of this application may further include other devices. This is not limited in the embodiments of this application. In addition, in this embodiment of this application, the network monitoring device may integrate all functions into one independent physical device, or may distribute functions on a plurality of independent physical devices. This is not limited in the embodiments of this application.

The terminal device is a network end device close to a user side, for example, may be an optical network terminal (ONT). The ONT may also be referred to as an optical modem, or, for example, may be a set top box (STB). The terminal device can send a service request to the content server to obtain a service provided by the content server. The content server may also be referred to as a content source platform, and may be one or more independent servers, or may be a cloud server formed by a content delivery network (CDN). This is not limited in the embodiments of this application. In the network system, the content server can respond to the service request of the terminal device, and provide a service for the terminal device.

A video request of terminal device 1 is used as an example. Terminal device 1 sends the video request to the content server. The video request is transmitted to the content server through network link 1 formed by node device 1, node device 2, . . . , and node device N. The content server receives the video request, and sends video data to terminal device 1 based on the video request. The video data may also be transmitted to terminal device 1 through network link 1.

In this embodiment of this application, node device 1 and node device N+1 may be used as user access devices for the terminal device to access a network, for example, may be an OLT in a typical telecommunications network. Node device N is a node device connected to the content server, for example, may be a CR. One or more other types of node devices may further exist between the OLT and the CR, including but not limited to a device such as an LSW or a BRAS. This is not limited in this embodiment of this application.

In the network system, a link segment is formed between any two node devices that have a data receiving/sending relationship with each other. For example, a link segment is formed between node device 1 and node device 2. The network monitoring device can monitor each link segment in the network system, and obtain a network performance indicator that can indicate transmission performance of the link segment. For example, the network performance indicator may be a KPI, or may be another parameter with a similar function. In this embodiment of this application, an example in which the KPI is used as the network performance indicator is used for description. In this embodiment of this application, the network monitoring device may obtain a plurality of types of KPIs of the target link segment, including but not limited to bandwidth utilization, a packet loss rate, port optical power, and the like.

Similarly, the terminal monitoring device can monitor the terminal device, and obtain a user quality indicator that can indicate user quality of service of the terminal device. For example, the user quality indicator may be a KQI, or may be another parameter with a similar function. In this embodiment of this application, an example in which the KQI is used as the user quality indicator is used for description. In some embodiments of this application, the user quality indicator may be set based on a specific type of a service in the terminal device. For example, for a video service, play duration and video freeze duration of the video may be set as KQIs. For another example, for an Internet access service, a delay and a packet loss rate may be set as KQIs.

Although the KPI can reflect transmission performance of the link segment to some extent, the KPI cannot accurately indicate whether the link segment is faulty. Specifically, the transmission performance of the link segment is affected by a plurality of factors. For example, if the link segment is overloaded, a packet loss rate of the link segment increases, but the link segment is not actually faulty. Therefore, how to monitor a potential faulty link segment in the network system needs to be further studied.

In view of this, an embodiment of this application provides a link fault monitoring method, and the method may be applied to a network monitoring device. In the link fault monitoring method provided in an embodiment of this application, a poor-quality parameter that may be used to determine whether a link segment is faulty is defined, and monitoring of each link segment is implemented based on the poor-quality parameter. The poor-quality parameter is in a one-to-one correspondence with the link segment, and the poor-quality parameter corresponding to any link segment may be understood as a proportion of a quantity of abnormal terminal devices in the terminal devices that transmit data by using the link segment. For example, link segment A between node device 1 and node device 2 corresponds to poor-quality parameter a, and is used to represent a proportion of a quantity of abnormal terminal devices in the terminal devices that transmit data using link segment A. For another example, link segment B between node device N+1 and node device 2 corresponds to poor-quality parameter b, and is used to indicate a proportion of a quantity of abnormal terminal devices in the terminal devices that transmit data by using link segment B.

The abnormal terminal device may be determined based on at least one KQI of the terminal device. Specifically, each terminal device corresponds to at least one KQI, and whether the terminal device is an abnormal terminal device can be further determined based on a preset determining condition (a second determining condition) of the abnormal terminal device and the at least one KQI corresponding to the terminal device. In other words, whether user quality of service of the terminal device is poor is determined.

In the at least one KQI of the terminal device, each KQI corresponds to a threshold. For example, if KQI 1 corresponds to threshold 1, KQI 2 corresponds to threshold 2, and KQI 3 corresponds to threshold 3, this embodiment of this application provides a determining condition of an abnormal terminal device, which may be expressed as:

Whether the terminal device is an abnormal terminal device=(KQI 1: Threshold 1), (KQI 2: Threshold 2), or (KQI 3: Threshold 3)

(KQI 1: threshold 1) indicates that KQI 1 is compared with threshold 1 to determine whether KQI 1 exceeds the threshold. The same applies to (KQI 2: Threshold 2) and (KQI 3: Threshold 3), and details are not described again. In other words, if one of KQI 1, KQI 2, and KQI 3 of terminal device 1 exceeds the threshold, it indicates that terminal device 1 is an abnormal terminal device.

It may be understood that when the monitoring strength is relatively weak, the determining condition of the abnormal terminal device may also be set as follows:

Whether the terminal device is an abnormal terminal device=(KQI 1: Threshold 1), (KQI 2: Threshold 2), and (KQI 3: Threshold 3)

In other words, only when all KQIs of KQI 1, KQI 2, and KQI 3 of terminal device 1 exceed the threshold, it is determined that terminal device 1 is an abnormal terminal device.

A specific determining condition of an abnormal terminal device to be used may be flexibly set based on the monitoring strength, and this is not limited. It should be noted that for some types of KQIs, for example, video freeze duration, if the KQI is greater than a threshold corresponding to the KQI, it indicates that user quality of service of the terminal device is poor, and the KQI exceeds the threshold. For some other types of KQIs, for example, when video data is transmitted based on an adaptive bit rate protocol, if a KQI of a resolution level of the video data received by the terminal device is less than a threshold corresponding to the KQI, it indicates that the user quality of service of the terminal device is poor, and the KQI exceeds the threshold.

It may be understood that if link segment A is faulty, the proportion of a quantity of abnormal terminal devices in at least one terminal device that transmits data by using link segment A increases. In other words, the poor-quality parameter of link segment A increases. Therefore, the poor-quality parameter of link segment A can be used to determine whether link segment A is a faulty link segment. Next, the link fault monitoring method provided in this embodiment of this application is further described by using an example in the following embodiments.

Embodiment 1

In the network system shown in FIG. 1, the network monitoring device can monitor a potential faulty link segment in each network link in the network system. In this embodiment of this application, the network monitoring device may periodically monitor statuses of network links at a preset time interval, or may trigger a monitoring process based on a backend instruction. In a monitoring process, the network monitoring device can detect the link segments monitored by the network monitoring device. The following describes detection on a target link segment by the network monitoring device.

In this embodiment of this application, the target link segment may be any link segment of the link segments monitored by the network monitoring device. In other words, the network monitoring device may detect, based on the following method, the link segments monitored by the network monitoring device. It may be understood that the target link segment may alternatively be a specific link segment. For example, the network monitoring device receives a monitoring instruction entered by the backend or sent by another device, and performs monitoring based on the target link segment indicated by the monitoring instruction. Details are not described again.

Figure 2:
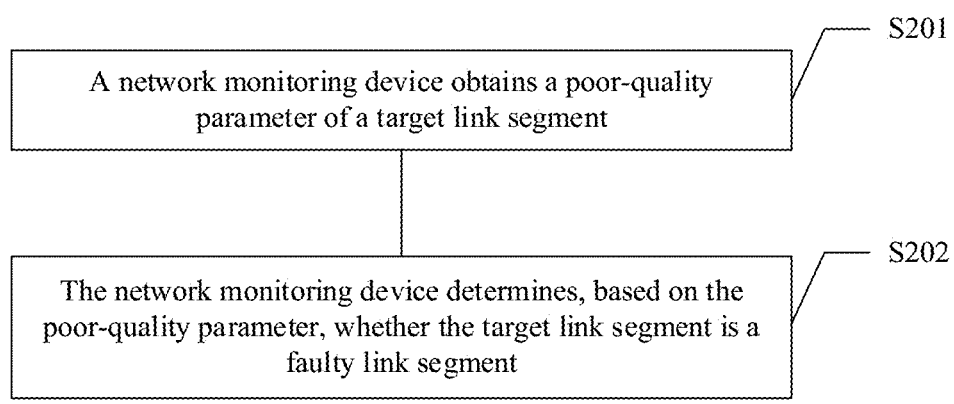
FIG. 2 is a schematic flowchart of a link fault monitoring method according to an embodiment of this application.

FIG. 2 is an example of a schematic flowchart of a link fault monitoring method according to an embodiment of this application. As shown in FIG. 2, the method mainly includes the following steps.

S201: A network monitoring device obtains a poor-quality parameter of a target link segment. The poor-quality parameter is a proportion of a quantity of abnormal terminal devices in at least one target terminal device that transmits data by using the target link segment.

In this embodiment of this application, the network monitoring device first determines the at least one target terminal device that transmits data by using the target link segment, then determines one or more abnormal terminal devices in the at least one target terminal device, and further obtains the poor-quality parameter of the target link segment based on a quantity of the at least one target terminal device and the quantity of abnormal terminal devices in the at least one target terminal device. The at least one target terminal device is at least one terminal device that transmits data using the target link segment. For example, if the network monitoring device first determines that there are a total of 100 terminal devices that transmit data by using link segment A, and 80 terminal devices of them are abnormal terminal devices, the network monitoring device can obtain that the poor-quality parameter of link segment A is 80/100=0.8.

S202: The network monitoring device determines, based on the poor-quality parameter, whether the target link segment is a faulty link segment.

For example, if the poor-quality parameter is greater than a preset first threshold, it is determined that the target link segment is a faulty link segment; otherwise, it is determined that the target link segment is a normal link segment. Link segment A is used as an example. It is assumed that the first threshold is 0.5, and the poor-quality parameter of link segment A is 0.8. Because the poor-quality parameter of link segment A is greater than the first threshold, it indicates that more terminal devices in the terminal devices that transmit data by using link segment A are abnormal terminal devices. Therefore, it can be determined that link segment A may be faulty. In other words, link segment A is a faulty link segment.

In a possible implementation, the network monitoring device may further combine the poor-quality parameter with a KPI, to improve accuracy of a detection result. For example, if the poor-quality parameter is greater than the preset first threshold, and at least one KPI of the target link segment meets a preset first determining condition, the network monitoring device determines that the target link segment is a faulty link segment.

In one example, the network monitoring device can obtain the at least one KPI of the target link segment, and a specific implementation form of the first determining condition may be set based on the monitoring strength of the network monitoring device. For instance, when the monitoring strength is relatively high, the first determining condition may be: If one KPI in the at least one KPI exceeds the threshold, it is determined that the at least one KPI of the target link segment meets the first determining condition. For another example, when the monitoring strength is relatively low, the first determining condition may be: If all KPIs in the at least one KPI exceed the threshold, it is determined that the at least one KPI of the target link segment meets the first determining condition, or the like.

It should be noted that each KPI corresponds to a preset threshold, and the network monitoring device can determine, based on a relative magnitude relationship between the KPI and the threshold corresponding to the KPI, whether the KPI exceeds the threshold. For example, for some types of KPIs, for example, a packet loss rate, if the KPI is greater than a threshold corresponding to the KPI, it indicates that the transmission performance of the link segment is poor, and the KPI exceeds the threshold. For other types of KPIs, for example, a minimum value of receive optical power of node devices at both ends of a link segment, if the KPI is less than a threshold corresponding to the KPI, the transmission performance of the link segment is poor, and the KPI exceeds the threshold.

By using the foregoing method, the poor-quality parameter is combined with the KPI, so that the accuracy of the detection result is improved, the quantity of falsely obtained faulty link segments is reduced, and subsequent network maintenance overheads are reduced.

In a possible implementation, the network monitoring device may collect at least one KPI of the link segments at a same time interval as the terminal monitoring device. For example, assuming that the terminal monitoring device collects at least one KQI of the terminal devices every 5 minutes, the network monitoring device also collects at least one KPI of the link segments every 5 minutes, to ensure real-time data detection.

In a possible implementation, the network monitoring device may further summarize faulty link segments by using days and weeks as dimensions, to form a statistical report. In the statistical report, link segments are sorted from most to least of the number of times that each link segment is determined as a faulty link segment in one day, for operation and maintenance personnel to proactively check the network. In addition, in a possible implementation, after determining the faulty link segment, the network monitoring device can further generate a fault alarm, to alert operation and maintenance personnel in a timely manner.

Embodiment 2

As described in S201 in Embodiment 1, the network monitoring device first determines an abnormal terminal device in at least one target terminal device, to obtain a poor-quality parameter of a target link segment. Next, a process in which the network monitoring device obtains the poor-quality parameter of the target link segment is further described in Embodiment 2 of this application.

Figure 3:
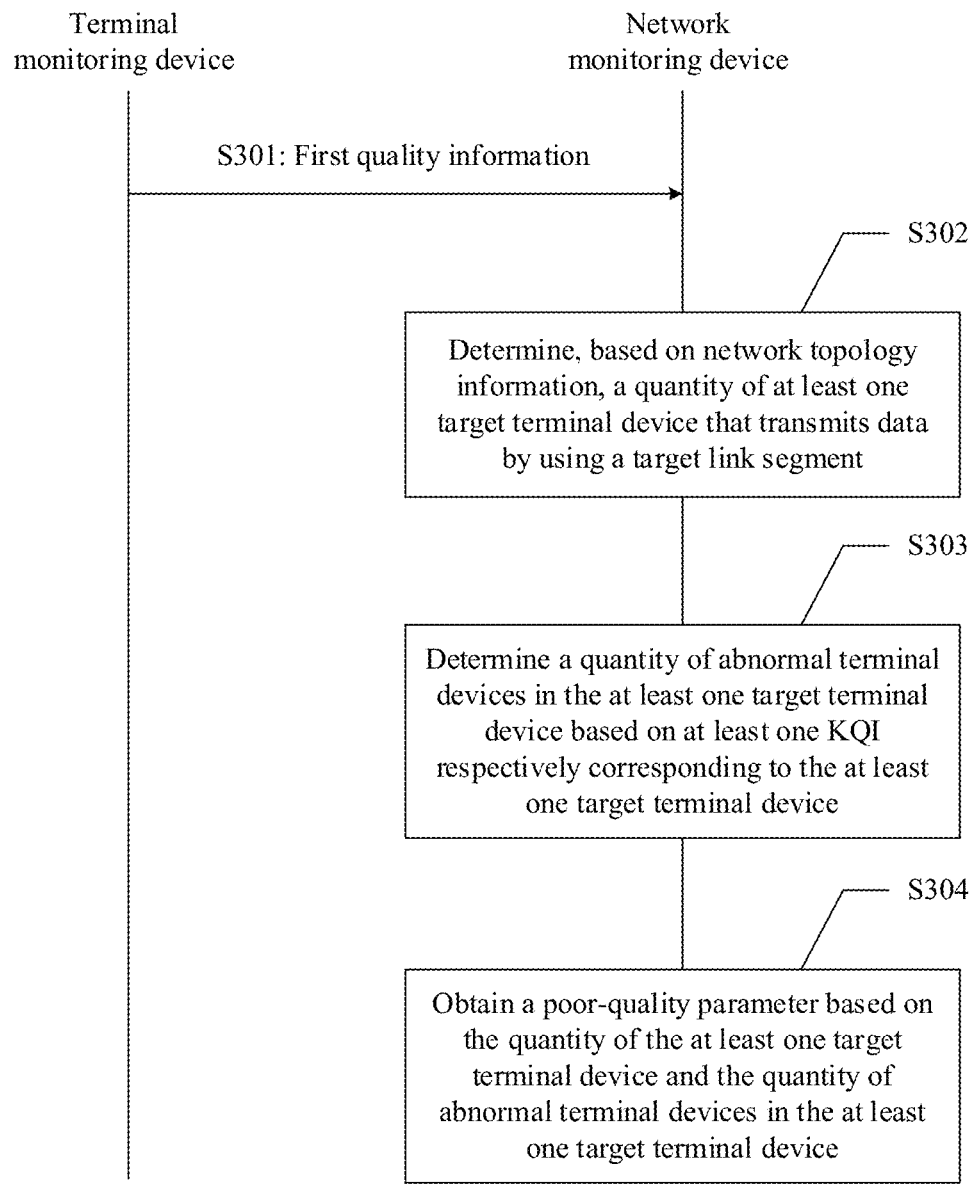
FIG. 3 is a schematic flowchart of a method for obtaining a poor-quality parameter according to an embodiment of this application.

In this embodiment of this application, the network monitoring device directly determines the abnormal terminal device in the at least one target terminal device based on the determining conditions of the abnormal terminal device, to obtain the poor-quality parameter of the target link segment. For example, the implementation shown in FIG. 3 is used by the network monitoring device and mainly includes the following steps.

S301: The network monitoring device receives first quality information sent by a terminal monitoring device.

The first quality information includes identification information of a terminal device monitored by the terminal monitoring device and at least one KQI corresponding to the terminal device. For example, if the at least one KQI includes KQI 1 (video freeze duration), KQI 2 (service delay), and KQI 3 (service packet loss rate), the first quality information is shown in Table 1.

TABLE 1

| Identification information | KQI 1 | KQI 2 | KQI 3 |
|---|---|---|---|
| UE 1 | 100 | 3 | 0.01% |
| UE 2 | 90 | 4 | 0.01% |
| UE 3 | 95 | 5 | 0.01% |
| UE 4 | 98 | 2 | 0.01% |
| UE 5 | 87 | 5 | 0.02% |

UE 1 is identification information of terminal device 1, and may be generally a media access control (MAC) address of terminal device 1, a subscriber identification module (subscriber identification module) number of terminal device 1, a user account of a terminal device user, or the like. The same applies to UE 2 to UE 5, and details are not described again.

In some application scenarios, some terminal devices (for example, terminal device x) may correspond to a plurality of user accounts. For example, user 1, user 2, and user 3 are all user accounts in terminal device x. In this case, the terminal monitoring device may separately obtain KQI 1, KQI 2, and KQI 3 of user 1, KQI 1, KQI 2, and KQI 3 of user 2, and KQI 1, KQI 2, and KQI 3 of user 3. An average value of KQI 1 of user 1, KQI 1 of user 2, and KQI 1 of user 3 is used as KQI 1 of terminal device x. The same applies to KQI 2 and KQI 3, and details are not described again. It may be understood that the terminal monitoring device may alternatively use user 1, user 2, and user 3 as three different pieces of identification information, and send KQI 1, KQI 2, and KQI 3 respectively corresponding to user 1, user 2, and user 3 to the network monitoring device by using the first quality information.

Generally, the terminal monitoring device may periodically obtain and send the first quality information shown in Table 1 to the network monitoring device, so that the network monitoring device may periodically monitor the statuses of the link segments.

S302: The network monitoring device determines, based on network topology information, a quantity of at least one target terminal device that transmits data using a target link segment.

In this embodiment of this application, the network topology information is obtained in advance by the network monitoring device through network topology restoration. Specifically, the network topology information may be obtained by the network monitoring device through topology link restoration in a network initialization phase. For example, the network monitoring device may obtain the network topology information in the following at least two manners:

Manner 1: The network monitoring device obtains the network topology information by using a topology restoration algorithm based on configuration data of a device and a service that are queried from the node devices. For example, a layer-2 network link may obtain network topology information based on a MAC address forwarding table between the node devices, and a layer-3 network link may obtain network topology information based on a route forwarding table between the node devices and an Internet protocol (IP) address.

Manner 2: If all the node devices in the network system support a link layer discovery protocol (LLDP), the network monitoring device may generate the network topology information by obtaining a network connection relationship discovered by the LLDP on the node devices.

In a specific example, the network topology information is shown in Table 2:

As shown in Table 2, link segments used for transmitting data by UE 1 (terminal device 1) include Link 1, Link 2, and Link 3, link segments used for transmitting data by UE 2 (terminal device 2) include Link 4, Link 5, and Link 3, link segments used for transmitting data by UE 3 (terminal device 3) include Link 6, Link 2, and Link 7, link segments used for transmitting data by UE 4 (terminal device 4) include Link 8 and Link 3, and link segments used by UE 5 (terminal device 5) for transmitting data include Link 1, Link 5, and Link 8.

Assuming that the target link segment is Link 3, the network monitoring device determines, based on the network topology information shown in Table 2, that target terminal devices that transmit data by using Link 3 are terminal device 1, terminal device 2, and terminal device 4, and a quantity of at least one target terminal device corresponding to Link 3 is 3.

S303: The network monitoring device determines an abnormal terminal device in the at least one target terminal device based on at least one KQI respectively corresponding to the at least one target terminal device.

Specifically, the network monitoring device may obtain, from the first quality information shown in Table 1, a plurality of KQIs respectively corresponding to terminal device 1, terminal device 2, and terminal device 4, and determine, based on the determining condition of the abnormal terminal device, whether terminal device 1, terminal device 2, and terminal device 4 are abnormal terminal devices. Assuming that it is determined that terminal device 1 and terminal device 2 are abnormal terminal devices, it is determined that the quantity of abnormal terminal devices in the at least one target terminal device is 2.

S304: The network monitoring device obtains a poor-quality parameter based on the quantity of the at least one target terminal device and the quantity of abnormal terminal devices in the at least one target terminal device.

For example, if the network monitoring device determines that the quantity of the at least one target terminal device is 3, and the quantity of abnormal terminal devices is 2, the poor-quality parameter of the target link segment is obtained as 0.67.

In the network system, a plurality of terminal monitoring devices usually send the first quality information to the network monitoring device. Each terminal monitoring device is configured to monitor a different terminal device. By using the foregoing method, the network monitoring device determines the abnormal terminal device in the at least one target terminal device based on the determining condition of the abnormal terminal device. This facilitates unified management by a network operator. Specifically, if the network operator needs to adjust monitoring strength, only the thresholds corresponding to the KQIs in the network monitoring device need to be modified, and the terminal monitoring devices do not need to be modified one by one.

Embodiment 3

In another implementation, the network monitoring device may further obtain a poor-quality parameter of a

TABLE 2

Figure 4:
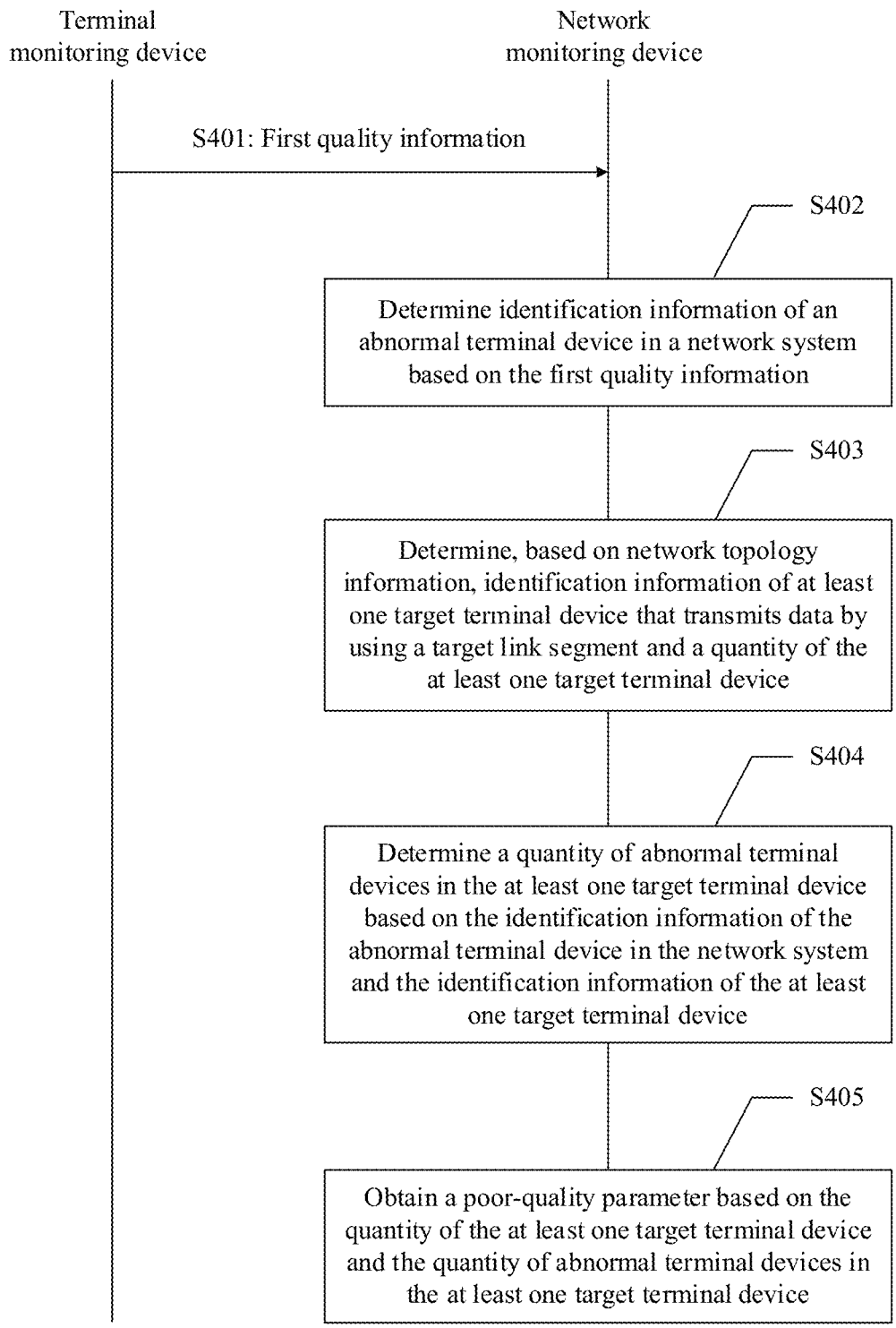
FIG. 4 is a schematic flowchart of a method for obtaining a poor-quality parameter according to an embodiment of this application.

| Link segment | Link 1 | Link 2 | Link 3 | Link 4 | Link 5 | Link 3 | Link 6 |
|---|---|---|---|---|---|---|---|
| Identification information | UE 1 | UE 1 | UE 1 | UE 2 | UE 2 | UE 2 | UE 3 |
| Link segment | Link 2 | Link 7 | Link 8 | Link 3 | Link 1 | Link 5 | Link 8 |
| Identification information | UE 3 | UE 3 | UE 4 | UE 4 | UE 5 | UE 5 | UE 5 | target link segment by using the process shown in FIG. 4, which mainly includes the following steps:

S401: The network monitoring device receives first quality information sent by a terminal monitoring device.

S402: The network monitoring device determines identification information of an abnormal terminal device in the network system based on the first quality information. Table 1 is used as an example. The network monitoring device determines, based on the KQIs respectively corresponding to UE 1 to UE 5, whether terminal device 1 to terminal device 5 are abnormal terminal devices. It is assumed that the network monitoring device determines that terminal device 1, terminal device 2, and terminal device 5 are abnormal terminal devices.

S403: The network monitoring device determines, based on network topology information, identification information of at least one target terminal device that transmits data by using a target link segment and a quantity of the at least one target terminal device. Table 2 is used as an example. If it is determined that the target terminal devices that transmit data using Link 3 are terminal device 1, terminal device 2, and terminal device 4, the quantity of at least one target terminal device corresponding to Link 3 is 3.

S404: The network monitoring device determines a quantity of abnormal terminal devices in the at least one target terminal device based on the identification information of the abnormal terminal device in the network system and the identification information of the at least one target terminal device. For example, in S402, if it is determined that terminal device 1, terminal device 2, and terminal device 5 are abnormal terminal devices, and the target terminal devices of Link 3 are terminal device 1, terminal device 2, and terminal device 4, it is determined that abnormal terminal devices in the at least one target terminal device of Link 3 are terminal device 1 and terminal device 2, and the quantity of abnormal terminal devices is 2.

S405: The network monitoring device obtains a poor-quality parameter based on the quantity of the at least one target terminal device and the quantity of abnormal terminal devices in the at least one target terminal device. For example, if the network monitoring device determines that the quantity of the at least one target terminal device is 3, and the quantity of abnormal terminal devices in the at least one target terminal device is 2, the poor-quality parameter of the target link segment is obtained as 0.67.

Embodiment 4

In another implementation, the terminal monitoring device may determine the identification information of the abnormal terminal device in the network system, and the network monitoring device may determine the abnormal terminal device in the at least one target terminal device based on a monitoring result of the terminal monitoring device, to obtain the poor-quality parameter of the target link segment.

For example, the network monitoring device receives second quality information sent by the terminal monitoring device, where the second quality information includes identification information of an abnormal terminal device detected by the terminal monitoring device through monitoring. Terminal monitoring device M is used as an example. Terminal monitoring device M is responsible for monitoring the quality of service of six terminal devices from terminal device a to terminal device f. In this embodiment of this application, terminal monitoring device M separately obtains at least one KQI for terminal device a to terminal device f Whether terminal device a to terminal device f are abnormal terminal devices is determined based on the at least one KQI of terminal device a to terminal device f. For a specific determining condition of the abnormal terminal device, refer to the foregoing embodiment. Details are not described again. Assuming that terminal monitoring device M determines that terminal devices a, b, and c are abnormal terminal devices, terminal monitoring device M sends the identification information of terminal devices a, b, and c to the network monitoring device by using the second quality information.

The network monitoring device obtains identification information of an abnormal terminal device in the network system based on the second quality information received from the one or more terminal monitoring devices, and further performs S403 to S405 shown in FIG. 4. Details are not described again.

By using the foregoing method, the terminal monitoring device obtains at least one KQI of the terminal devices, and determines, with reference to the determining conditions of the abnormal terminal device, whether the terminal devices monitored by the terminal monitoring device are abnormal terminal devices. When the network monitoring device detects a target link segment, only abnormal terminal devices in the at least one target terminal device in the target link segment need to be determined, and whether the terminal devices in the network system are abnormal terminal devices does not need to be determined one by one. This helps reduce operation load of the network monitoring device, and improve stability and efficiency of the network monitoring device.

Embodiment 5

The link fault monitoring method provided in this embodiment of this application may be further used to determine a suspected root cause link segment in which an exception occurs in a to-be-detected terminal device. Specifically, when an exception occurs in the terminal device, which link segment in the network system causes the exception can be quickly determined, so that operation and maintenance personnel can resolve the exception problem of the terminal device, and user experience of a terminal user can be improved.

Figure 5:
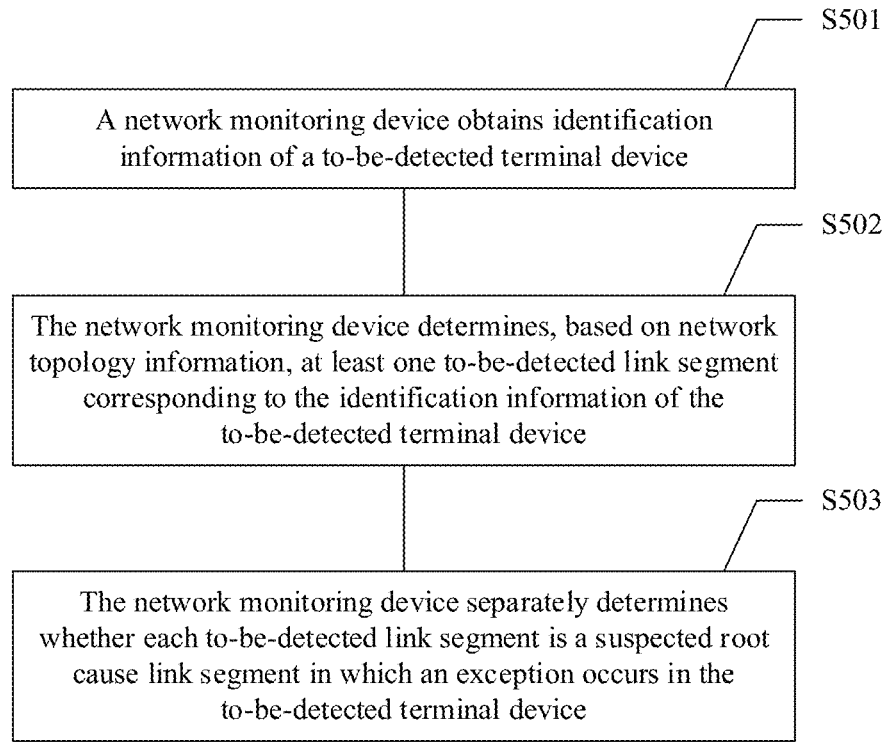
FIG. 5 is a schematic flowchart of determining a suspected root cause link segment according to an embodiment of this application.

In a possible implementation, the network monitoring device may determine, based on network topology information, at least one to-be-detected link that transmits data for the to-be-detected terminal device, and perform link detection on link segments in the to-be-detected link, to determine a root cause link that causes an exception in the to-be-detected terminal device. The following steps shown in FIG. 5 are mainly included.

S501: The network monitoring device obtains identification information of a to-be-detected terminal device.

In this embodiment of this application, the to-be-detected terminal device may be a terminal device in which an exception occurs, namely, an abnormal terminal device. Specifically, the to-be-detected terminal device may be a terminal device in abnormal terminal devices obtained by the network monitoring device based on the first quality information sent by the terminal monitoring device. Alternatively, the to-be-detected terminal device may be a terminal device corresponding to the identification information of the abnormal terminal device included in the second quality information sent by the terminal monitoring device.

Optionally, the to-be-detected terminal device may alternatively be a corresponding terminal device that receives user complaint information. For example, when a user complains about poor user experience in a process of using a terminal device, the network monitoring device determines, based on the complaint-related information, the terminal device being used by the user, and uses the terminal device as the to-be-detected terminal device.

S502: The network monitoring device determines, based on network topology information, at least one to-be-detected link segment corresponding to the identification information of the to-be-detected terminal device.

The network topology information shown in Table 2 is used as an example. Assuming that the identification information of the to-be-detected terminal device is UE 1, it is determined that the to-be-detected link segments are link segments Link 1, Link 2, and Link 3.

S503: The network monitoring device separately determines whether each to-be-detected link segment is a suspected root cause link segment in which an exception occurs in the to-be-detected terminal device.

Specifically, for any to-be-detected link segment, the network monitoring device uses the to-be-detected link segment as a target link segment, and determines, based on the method shown in FIG. 2 to FIG. 4, whether the to-be-detected link segment is a faulty link segment. The specific process is not described again. If it is determined that the to-be-detected link segment is a faulty link segment, it is determined that the to-be-detected link segment is a suspected root cause link segment that causes the exception of the to-be-detected terminal device.

For example, the to-be-detected link segments are link segments Link 1, Link 2, and Link 3, and corresponding poor-quality parameters are shown in Table 3.

TABLE 3

| Link segment | Quantity of abnormal terminal devices | Quantity of terminal devices | Poor-quality parameter |
| --- | --- | --- | --- |
| Link 1 | 4 | 100 | 0.04 |
| Link 2 | 20 | 100 | 0.2 |
| Link 3 | 24 | 100 | 0.24 |

As shown in Table 3, a total of 100 terminal devices transmit data by using the link segment Link 1, and four terminal devices of them are abnormal terminal devices. Therefore, a poor-quality parameter of the link segment Link 1 is 0.04. The same applies to the link segment Link 2 and the link segment Link 3, and details are not described again.

Assuming that the preset first threshold in the network monitoring device is 0.1, a relative magnitude relationship between the poor-quality parameter and the first threshold is shown in Table 4.

TABLE 4

| Link segment | Poor-quality parameter | Whether it is greater than the first threshold |
| --- | --- | --- |
| Link 1 | 0.04 | No |
| Link 2 | 0.2 | Yes |
| Link 3 | 0.24 | Yes |

It is assumed that at least one KPI corresponding to the to-be-detected link segment collected by a network monitoring system is shown in Table 5.

TABLE 5

| Link segment | KPI 1 | KPI 2 | KPI 3 |
| --- | --- | --- | --- |
| Link 1 | 0.01% | 30% | 40% |
| Link 2 | 0.01% | 40% | 40% |
| Link 3 | 0.01% | 50% | 50% |

In Table 5, KPI 1 is a packet loss rate, KPI 2 is an inbound bandwidth utilization, and KPI 3 is an outbound bandwidth utilization. The network monitoring device uses the link segment Link 1 as a target link segment based on the method shown in FIG. 2, and determines, based on three KPIs corresponding to the to-be-detected link segment Link 1 and the poor-quality parameter of Link 1, whether Link 1 is a suspected root cause link segment in which an exception occurs in the to-be-detected terminal device. Similarly, it may also be determined whether the link segments Link 2 and Link 3 are suspected root cause link segments in which an exception occurs in the to-be-detected terminal device. For example, a final determining result may be shown in Table 6.

TABLE 6

| Link segment | Whether the poor-quality parameter is excessively large | Whether the KPI exceeds the threshold | Whether it is a suspected root cause link segment |
| --- | --- | --- | --- |
| Link 1 | Yes | No | No |
| Link 2 | Yes | Yes | Yes |
| Link 3 | No | Yes | No |

As shown in Table 6, the link segment Link 2 is a suspected root cause link segment in which an exception occurs in the to-be-detected terminal device. In a possible implementation, the network monitoring device may output the identification information of the link segment Link 2, for operation and maintenance personnel to quickly locate the link segment Link 2, and perform further maintenance on the link segment Link 2.

The foregoing mainly describes the solutions provided in this application from the perspective of method embodiments. It may be understood that, to implement the foregoing functions, the network monitoring device may include a corresponding hardware structure and/or software module for performing the functions. A person skilled in the art would understand that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 6:
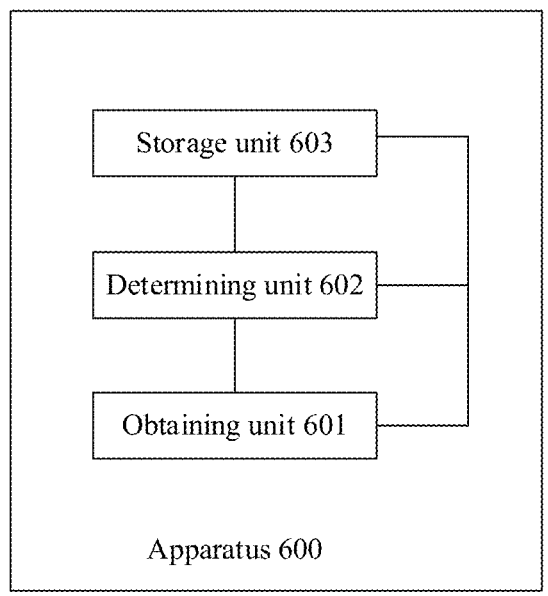
FIG. 6 is a schematic diagram of an apparatus according to an embodiment of this application.

When an integrated unit is used, FIG. 6 is a possible example block diagram of an apparatus in an embodiment of this application. The apparatus 600 may exist in a form of software or hardware. The apparatus 600 may include an obtaining unit 601 and a determining unit 602. The apparatus 600 may further include a storage unit 603, configured to store program code and data of the apparatus 600.

The apparatus 600 may be a processor or a controller, for example, may be a central processing unit (CPU), a general-purpose processor, a digital signal processor (DSP), an application specific integrated circuit (ASIC), a field programmable gate array (FPGA), or another programmable logic device, a transistor logic device, a hardware component, or any combination thereof. The apparatus 600 may implement or execute various example logical blocks, modules, and circuits described with reference to content disclosed in the present invention. The processor may be a combination of processors implementing a computing function, for example, a combination of one or more microprocessors, or a combination of the DSP and a microprocessor.

The apparatus 600 may be the network monitoring device in any one of the foregoing embodiments, or may be a semiconductor chip disposed in the network monitoring device. Specifically, in an embodiment, the obtaining unit 601 is configured to obtain a poor-quality parameter of a target link segment, where the poor-quality parameter is a proportion of a quantity of abnormal terminal devices in at least one target terminal device that transmits data by using the target link segment; and the determining unit 602 is configured to determine, based on the poor-quality parameter, whether the target link segment is a faulty link segment.

In a possible implementation, when determining, based on the poor-quality parameter, whether the target link segment is a faulty link segment, the determining unit 602 is configured to:

if the poor-quality parameter is greater than a preset first threshold and at least one network performance indicator of the target link segment meets a preset first determining condition, determine that the target link segment is a faulty link segment.

The first determining condition includes that in the at least one network performance indicator, a first network performance indicator is greater than a second threshold corresponding to the first network performance indicator, and/or a second network performance indicator is less than a third threshold corresponding to the second network performance indicator.

In a possible implementation, before obtaining the poor-quality parameter of the target link segment, the obtaining unit 601 is further configured to:

determine an abnormal terminal device in the at least one target terminal device, where the abnormal terminal device is a target terminal device of which at least one user quality indicator meets a preset second determining condition.

The second determining condition includes that in the at least one user quality indicator, a first user quality indicator is greater than a fourth threshold corresponding to the first user quality indicator, and/or a second user quality indicator is less than a fifth threshold corresponding to the second user quality indicator.

In a possible implementation, when obtaining the poor-quality parameter of the target link segment, the obtaining unit 601 is configured to:

Determine a quantity of at least one target terminal device based on network topology information; and obtain, based on the quantity of the at least one target terminal device and the quantity of abnormal terminal devices in the at least one target terminal device, the poor-quality parameter corresponding to the target link segment.

In a possible implementation, when determining the abnormal terminal device in the at least one target terminal device, the obtaining unit 601 is configured to: receive first quality information respectively corresponding to the at least one target terminal device, where the first quality information of any target terminal device includes at least one user quality indicator of the target terminal device; and determine the abnormal terminal device in the at least one target terminal device based on the first quality information.

In a possible implementation, when determining the abnormal terminal device in the at least one target terminal device, the obtaining unit 601 is configured to: receive second quality information sent by a terminal monitoring device, where the second quality information includes identification information of an abnormal terminal device detected by the terminal monitoring device through monitoring; and determine the abnormal terminal device in the at least one target terminal device based on the second quality information.

In a possible implementation, before obtaining the poor-quality parameter of the target link segment, the obtaining unit 601 is further configured to obtain, based on the network topology information and identification information of a to-be-detected terminal device, at least one to-be-detected link used to transmit data for the to-be-detected terminal device. The target link segment is a link segment in the at least one to-be-detected link.

In a possible implementation, the determining unit 602 is further configured to: if it is determined, based on the poor quality parameter, that the target link segment is a faulty link segment, determine that the target link segment is a suspected root cause link segment in which an exception occurs in the to-be-detected terminal device.

Figure 7:
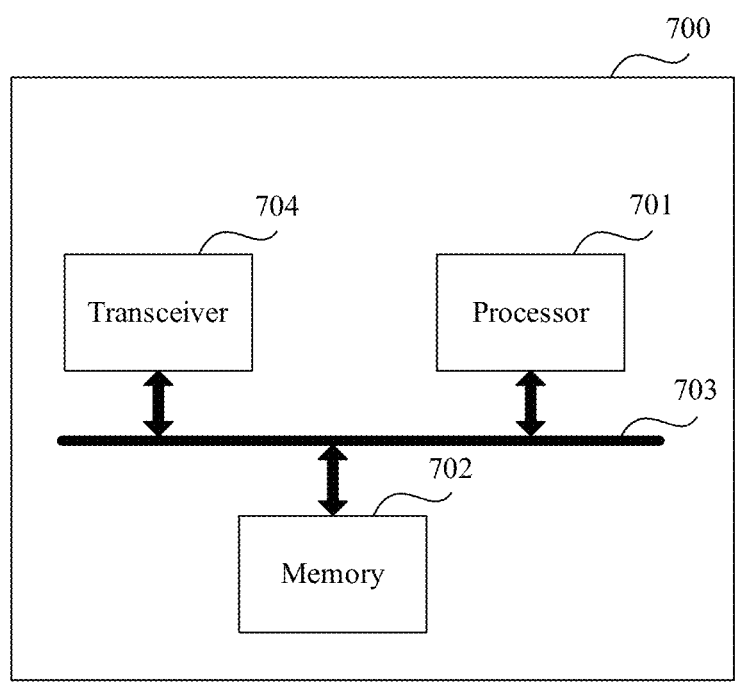
FIG. 7 is a schematic diagram of an apparatus according to an embodiment of this application.

FIG. 7 is a schematic diagram of an apparatus according to this application. The apparatus may be the network monitoring device in the foregoing embodiments. The apparatus 700 includes a processor 701 and a memory 702. Optionally, the apparatus 700 may further include a bus 703 and a transceiver 704. The transceiver 704 is configured to receive the first quality information and/or the second quality information, and the transceiver 704, the processor 701, and the memory 702 may be connected to each other through the bus 703. The bus 703 may be a peripheral component interconnect (PCI for short) bus, an extended industry standard architecture (EISA for short) bus, or the like. The bus 703 may be classified into an address bus, a data bus, a control bus, and the like. For ease of representation, only one thick line is used to represent the bus in FIG. 7, but this does not mean that there is only one bus or only one type of bus.

The processor 701 may be a CPU, a microprocessor, an ASIC, or one or more integrated circuits configured to control program execution in the solutions of this application.

The transceiver 704 is configured to transmit data with a terminal monitoring device or another device, such as an Ethernet, a RAN, a wireless local area network (WLAN), or a wired access network.

The memory 702 may be a read-only memory (ROM) or another type of static storage device that may store static information and instructions, a random access memory (RAM) or another type of dynamic storage device that may store information and instructions, an electrically erasable programmable read-only memory (EEPROM), a compact disc read-only memory (CD-ROM) or another optical disk storage, an optical disc storage (including compact discs, laser discs, optical discs, digital versatile discs, Blu-ray discs, and the like), a disk storage medium or another magnetic storage device, or any other medium that can be used to carry or store expected program code in a form of an instruction or a data structure and can be accessed by a computer, but is not limited thereto. The memory 702 may exist independently, and is connected to the processor 701 by using the bus 703. Alternatively, the memory 702 may be integrated with the processor 701.

The memory 702 is configured to store computer executable instructions for performing the solutions of this application, and the processor 701 controls execution. The processor 701 is configured to execute the computer executable instructions stored in the memory 702, to implement the link fault monitoring method provided in the foregoing embodiments of this application.

Optionally, the computer executable instructions in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The various illustrative logical units and circuits described in the embodiments of the present invention may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processor so that the processor may read information from the storage medium and write information to the storage medium. Alternatively, the storage medium may further be integrated into a processor. The processor and the storage medium may be disposed in an ASIC, and the ASIC may be disposed in a terminal device. Alternatively, the processor and the storage medium may also be disposed in different components of the terminal device.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to specific features and the embodiments thereof, it is clearly that various modifications and combinations may be made to them without departing from the scope of this application. Correspondingly, the specification and accompanying drawings are merely example description of this application defined by the appended claims, and is considered as any of or all modifications, variations, combinations or equivalents that cover the scope of this application. It is clearly that a person skilled in the art can make various modifications and variations to this application without departing from the scope of this application. This application is intended to cover these modifications and variations of this application provided that the modifications and variations of this application fall within the scope of protection defined by the following claims and equivalent technologies thereof

What is claimed is:

1. A link fault monitoring method, comprising:
   obtaining, by a network monitoring device, a poor-quality parameter of a target link segment, wherein the poor-quality parameter is a proportion of a quantity of abnormal terminal devices in at least one target terminal device that transmits data using the target link segment; and
   determining, by the network monitoring device based on the poor-quality parameter, whether the target link segment is a faulty link segment.

2. The method according to claim 1, wherein the determining, by the network monitoring device based on the poor-quality parameter, whether the target link segment is a faulty link segment comprises:
   if the poor-quality parameter is greater than a preset first threshold and at least one network performance indicator of the target link segment meets a preset first determining condition, determining, by the network monitoring device, that the target link segment is a faulty link segment, wherein
   the first determining condition comprises that in the at least one network performance indicator, a first network performance indicator is greater than or equal to a second threshold corresponding to the first network performance indicator, or a second network performance indicator is less than or equal to a third threshold corresponding to the second network performance indicator.

3. The method according to claim 1, wherein the method further comprises:
   determining, by the network monitoring device, an abnormal terminal device in the at least one target terminal device, wherein the abnormal terminal device is a target terminal device of which at least one user quality indicator meets a preset second determining condition, wherein the second determining condition comprises that in the at least one user quality indicator, a first user quality indicator is greater than a fourth threshold corresponding to the first user quality indicator, or a second user quality indicator is less than a fifth threshold corresponding to the second user quality indicator.

4. The method according to claim 3, wherein the obtaining, by a network monitoring device, a poor-quality parameter of a target link segment comprises:
   determining, by the network monitoring device, a quantity of the at least one target terminal device based on network topology information; and
   obtaining, by the network monitoring device based on the quantity of the at least one target terminal device and the quantity of abnormal terminal devices in the at least one target terminal device, the poor-quality parameter corresponding to the target link segment.

5. The method according to claim 3, wherein the determining, by the network monitoring device, an abnormal terminal device in the at least one target terminal device comprises:
   receiving, by the network monitoring device, first quality information respectively corresponding to the at least one target terminal device, wherein the first quality information of any target terminal device comprises at least one user quality indicator of the target terminal device; and
   determining, by the network monitoring device, the abnormal terminal device in the at least one target terminal device based on the first quality information.

6. The method according to claim 3, wherein the determining, by the network monitoring device, an abnormal terminal device in the at least one target terminal device comprises:
   receiving, by the network monitoring device, second quality information sent by a terminal monitoring device, wherein the second quality information comprises identification information of an abnormal terminal device detected by the terminal monitoring device through monitoring; and
   determining, by the network monitoring device, the abnormal terminal device in the at least one target terminal device based on the second quality information.

7. The method according to claim 1, wherein the method further comprises:
   obtaining, by the network monitoring device based on network topology information and identification information of a to-be-detected terminal device, at least one to-be-detected link used to transmit data for the to-be-detected terminal device, wherein the target link segment is a link segment in the at least one to-be-detected link.

8. The method according to claim 7, wherein if the network monitoring device determines, based on the poor-quality parameter, that the target link segment is a faulty link segment, the network monitoring device determines that the target link segment is a suspected root cause link segment in which an exception occurs in the to-be-detected terminal device.

9. An apparatus, comprising:
   at least one processor;
   one or more memories coupled to the at least one processor and storing instructions for execution by the at least one processor, the instructions executed by the at least one processor to cause the apparatus to:
   obtain a poor-quality parameter of a target link segment, wherein the poor-quality parameter is a proportion of a quantity of abnormal terminal devices in at least one target terminal device that transmits data using the target link segment; and
   determine, based on the poor-quality parameter, whether the target link segment is a faulty link segment.

10. The apparatus according to claim 9, wherein the instructions executed by the at least one processor further cause the apparatus to:
    if the poor-quality parameter is greater than a preset first threshold and at least one network performance indicator of the target link segment meets a preset first determining condition, determine that the target link segment is a faulty link segment, wherein
    the first determining condition comprises that in the at least one network performance indicator, a first network performance indicator is greater than a second threshold corresponding to the first network performance indicator, or a second network performance indicator is less than a third threshold corresponding to the second network performance indicator.

11. The apparatus according to claim 9, wherein the instructions executed by the at least one processor further cause the apparatus to:
    determine an abnormal terminal device in the at least one target terminal device, wherein the abnormal terminal device is a target terminal device of which at least one user quality indicator meets a preset second determining condition, wherein
    the second determining condition comprises that in the at least one user quality indicator, a first user quality indicator is greater than a fourth threshold corresponding to the first user quality indicator, or a second user quality indicator is less than a fifth threshold corresponding to the second user quality indicator.

12. The apparatus according to claim 11, wherein the instructions executed by the at least one processor further cause the apparatus to:
    determine a quantity of the at least one target terminal device based on network topology information; and
    obtain, based on the quantity of the at least one target terminal device and the quantity of abnormal terminal devices in the at least one target terminal device, the poor-quality parameter corresponding to the target link segment.

13. The apparatus according to claim 11, wherein the instructions executed by the at least one processor further cause the apparatus to: receive first quality information respectively corresponding to the at least one target terminal device, wherein the first quality information of any target terminal device comprises at least one user quality indicator of the target terminal device; and determine the abnormal terminal device in the at least one target terminal device based on the first quality information.

14. The apparatus according to claim 11, wherein the instructions executed by the at least one processor further cause the apparatus to: receive second quality information sent by a terminal monitoring device, wherein the second quality information comprises identification information of an abnormal terminal device detected by the terminal monitoring device through monitoring; and determine the abnormal terminal device in the at least one target terminal device based on the second quality information.

15. The apparatus according to claim 9, wherein the instructions executed by the at least one processor further cause the apparatus to: obtain, based on network topology information and identification information of a to-be-detected terminal device, at least one to-be-detected link used to transmit data for the to-be-detected terminal device, wherein the target link segment is a link segment in the at least one to-be-detected link.

16. The apparatus according to claim 15, wherein the instructions executed by the at least one processor further cause the apparatus to: if it is determined, based on the poor-quality parameter, that the target link segment is a faulty link segment, determine that the target link segment is a suspected root cause link segment in which an exception occurs in the to-be-detected terminal device.

17. A non-transitory storage medium storing a program that is executable by one or more processors, the program including instructions for:
   obtaining a poor-quality parameter of a target link segment, wherein the poor-quality parameter is a proportion of a quantity of abnormal terminal devices in at least one target terminal device that transmits data by using the target link segment; and
   determining based on the poor-quality parameter, whether the target link segment is a faulty link segment.

18. The non-transitory storage medium according to claim 17, wherein the program includes further instructions for:
   if the poor-quality parameter is greater than a preset first threshold and at least one network performance indicator of the target link segment meets a preset first determining condition, determining that the target link segment is a faulty link segment, wherein
   the first determining condition comprises that in the at least one network performance indicator, a first network performance indicator is greater than or equal to a second threshold corresponding to the first network performance indicator, or a second network performance indicator is less than or equal to a third threshold corresponding to the second network performance indicator.

19. The non-transitory storage medium according to claim 17, wherein the program includes further instructions for:
   determining an abnormal terminal device in the at least one target terminal device, wherein the abnormal terminal device is a target terminal device of which at least one user quality indicator meets a preset second determining condition, wherein
   the second determining condition comprises that in the at least one user quality indicator, a first user quality indicator is greater than a fourth threshold corresponding to the first user quality indicator, or a second user quality indicator is less than a fifth threshold corresponding to the second user quality indicator.

20. The non-transitory storage medium according to claim 17, wherein the program includes further instructions for:
   determining a quantity of the at least one target terminal device based on network topology information; and
   obtaining based on the quantity of the at least one target terminal device and the quantity of abnormal terminal devices in the at least one target terminal device, the poor-quality parameter corresponding to the target link segment.

* * * * *